United States Patent [19]

Shih et al.

[11] Patent Number: 5,567,511

[45] Date of Patent: Oct. 22, 1996

[54] NON-SHRINKABLE AND SHRINKABLE FOAMED POLYESTER FILM FOR THE LABELING OF PET CONTAINERS

[75] Inventors: Wayne K. Shih, Kingsport, Tenn.; Robert J. Turney, Hertfordshire, England

[73] Assignee: Eastman Chemical Company, Kingsport, Tenn.

[21] Appl. No.: 615,003

[22] Filed: Mar. 12, 1996

[51] Int. Cl.⁶ .................................. B32B 3/26; C08L 67/00
[52] U.S. Cl. .......................... 428/314.8; 525/437; 524/81; 524/284; 524/297; 156/DIG. 9; 428/304.4; 428/308.4; 428/314.8; 428/480; 521/50; 521/134; 521/138; 521/182
[58] Field of Search ..................... 525/437; 524/81, 524/284, 297; 156/D9; 428/304.4, 304.8, 314.8, 480; 521/50, 134, 138, 182

[56] References Cited

U.S. PATENT DOCUMENTS

| | | | |
|---|---|---|---|
| 4,744,465 | 5/1988 | Parker | 206/597 |
| 5,069,953 | 12/1991 | Kishikawa et al. | 428/201 |
| 5,399,595 | 3/1995 | Sublett et al. | 521/182 |
| 5,482,977 | 1/1996 | McConnell et al. | 521/81 |

*Primary Examiner*—Samuel A. Acquah
*Attorney, Agent, or Firm*—Cheryl J. Tubach; Harry J. Gwinnell

[57] ABSTRACT

A label for containers comprises a foamed polyester film that has a density of less than 1 g/cm³. The foamed polyester film may be blown away in air and then floated away in water during the recycle process for containers. After separation from the containers the foamed polyester film may be reclaimed by a chemical process to recover raw materials for polyesters.

7 Claims, No Drawings

NON-SHRINKABLE AND SHRINKABLE FOAMED POLYESTER FILM FOR THE LABELING OF PET CONTAINERS

TECHNICAL FIELD

This invention relates to labels for containers and more particularly to foamed polyester labels for plastic containers.

BACKGROUND OF THE INVENTION

Poly(ethylene terephthalate), commonly referred to as PET, is used to make beverage bottles as well as other containers for household products. PET has become one of the most recycled plastics. During the recycle process, labels are typically separated from containers after the containers are ground into pieces. The label pieces are first loosed and detached from container pieces by being blown away in an air stream. Some of the label pieces are separated when caught up in the air stream. The remaining label pieces are separated from the container pieces by water flotation. The container pieces are recycled while the label pieces are typically discarded.

The density differences between water, labels and containers is utilized in the water floatation step. For example, PET flakes, which are heavier than water, will sink while the label materials, which are lighter than water, will float. Typical label materials that float and are best suitable for the recycle process include polyolefins and foamed polystyrene. Non-foamed polystyrene have been used, however their density is slightly higher than water. Thus, the density of water must be raised by the addition of salt, soaps or surfactants to accomodate the higher density of non-foamed polystyrene.

Polyesters have not been widely used to make labels because polyester labels are not readily separable from the containers. The density of polyesters is greater than that of water, thus the polyester labels would sink along with the container material. The density difference is significant enough that raising the density of water by additives is not economically viable. The option of recycling the polyester labels and bottles together has been considered. However, this is also not viable since the ink on the labels would cause contamination of the recycled polyesters.

SUMMARY OF THE INVENTION

A label for containers comprises a foamed polyester film having a density of less than 1 g/cm$^3$ wherein the foamed polyester film may be blown away in air and then floated away in water during a recycle process for containers.

DESCRIPTION OF THE INVENTION

The present invention discloses the unique use of foamed polyester films to make labels for containers such that not only are the containers recyclable but also the labels through reclaiming raw materials from the polyesters. The density of the foamed polyester films must be less than that of water, i.e. 1 g/cm$^3$, to facilitate the recycle processes of containers. Labels that are made from such a light-weighted films are first blown away in air, and then floated away in water for separating the labels from the containers. The separated labels can be reclaimed by methanolysis, glycolysis or other chemical processes to recover the raw materials of the polyesters.

The thickness of the foamed polyester films is preferably from 6 microns to 5 millimeters (mm). The foamed polyester films are opaque white allowing for direct printing without a white undercoating.

Additives for providing enhanced properties to the foamed polyester film may be added to the polyester prior to foaming. Some examples of additives include slip agents, antiblocking agents, plasticizers, optical brightener and ultra violet inhibitor. Alternatively, the foamed polyester films can be extrusion or lamination coated on one side or on both sides using conventional techniques in order to enhance its properties. The coating materials are preferably clear polyesters, such as PET, with additives as listed above. Additionally, the coating materials may be the printed surface, rather than the foam film itself, that provides for product labelling.

The foamed polyester film is preferably made from polyesters of the type disclosed in U.S. Pat. Nos. 5,399,595 and 5,482,977; U.S. Ser. No. 494,197 filed Jun. 23, 1995, a continuation of Ser. No. 130,816 filed Oct. 4, 1993, now abandoned; and U.S. Ser. No. 532,208 filed Sep. 22, 1995.

The foamed polyester film is made by foaming a polyester material with chemical and/or physical blow agents and forming the foamed polyester into a film using conventional extrusion techniques.

Chemical blow agents are compounds that release gases due to reversible or irreversible thermal decomposition, or mixtures that liberate gases due to chemical reactions. Chemical compounds may be either inorganic and organic. Inorganic blow agents suitable for use in the present invention include ammonium carbonates, sodium carbonates and bicarbonates. Organic blow agents include azo and diazo compounds, N-nitroso compounds, sulfobylhydrazides, azides, triazines, triazoles and tetrazoles, sulfonyl semicarbazides, urea derivatives, guanidine derivatives, and ethers. Mixtures of compounds include acids and metals, organic acids and inorganic carbonates, nitriles and ammonium salts. Physical blow agents include chlorofluoro-carbons, halogenated hydrocarbons, volatile aliphatic hydrocarbons, gases such as carbon dioxide, nitrogen, air and other inert gases or mixtures.

Another method of making the foamed polyester film is by microcellular foaming technology. The polyester is extruded into a clear, flat sheet and then highly pressurized with an inert gas such as $CO_2$ or $N_2$ in a pressure chamber. The flat sheet remains under pressure until it has been saturated with the gas. Upon removing the flat sheet from the pressure chamber, the gas expand forming very small cells in the flat sheet. The resulting flat sheet has changed its color from clear to opaque white.

The labels may be made from non-shrinkable materials, such as foamed PET, which require adhesives to secure the labels to the containers. By non-shrinkable it is meant that the shrinkage of the foamed PET is less than 15 percent. The non-shrinkable foamed PET film may be produced by a flat die extrusion or a round die extrusion.

The labels may also be made from heat shrinkable materials, such as oriented foamed 1,4-cyclohexyldimethanol modified PET or isophthalic acid modified PET. The shrinkable foamed film may be produced by a flat die or a round die extrusion followed by stretching using a machine direction drafting or a transverse direction tentering. Alternatively, the shrinkable foamed film is produced by single or double bubble blown film processes. After a roll of film is prepared, the film may be printed and converted into shrink sleeves. A shrink tunnel is needed to apply the shrink sleeves to the containers. The shrinkable foamed polyester film typically has more than 15% shrinkage at 90° C. in water for 30 seconds.

The recyclable foamed polyester film is a suitable label material for containers made from PET and other plastics having density greater than one, glass or metal. When using the foamed polyester film for glass containers, additional benefits such as insulation (low thermal conductivity), energy absorption and shatter resistance are provided. Thick foamed polyester films are useful to provide insulation and cushioning for easy hand gripping. The opaque white, biaxially stretched foamed polyester film may be used for the interior and exterior coatings of metal cans.

The films of this invention and their preparation are illustrated by the following examples. The chemical blow agent used in the examples is Hydrocerol HK 40B (HK 40B) supplied by Boehringer Ingalheim KG of Germany. The HK 40B contains citric acids, sodium bicarbonate, and polyolefin. The physical blow agent used was nitrogen.

EXAMPLE 1

PETG was extruded into foamed sheet with 2 wt % HK 40B chemical blow agent. The thickness of the extruded foamed sheet was 0.35 mm which was subjected to stretching by using a film stretcher at 90° C. with a 4×1 stretch ratio. The stretched foamed film was then cut into 100 mm×100 mm square samples which were measured for their shrinkage in a constant water bath for 30 seconds at various water temperatures from 65° to 90° C. with an increment of 5° C.

EXAMPLE 2

The same composition and procedure as in Example 1 was used. The thickness of the extruded foamed sheet was changed to 0.5 mm.

EXAMPLE 3

The same composition and procedure as in Example 1 was used except that the amount of HK 40B was increased to 3 wt % and the extruded foamed sheet thickness was 0.62 mm.

EXAMPLE 4

The same composition and procedure as in Example 1 was used except that the amount of HK 40B was decreased to 1.5 wt % and the extruded foamed sheet thickness was 0.75 mm.

EXAMPLE 5

The same composition and procedure as in Example 4 was used except that the thickness of the extruded foamed sheet was 0.35 mm instead.

EXAMPLE 6

PETG with 0.5 wt % Talc and 0.1 wt % HK 40B was extruded into foamed sheet with a physical blow agent $N_2$. The thickness of the extruded foamed sheet was 1.05 mm. This sheet was not stretched.

EXAMPLE 7

PET with 0.75 wt % pyromellitic dianhydride and 1.25 wt % Talc was extruded into a foamed sheet with 0.05 wt % HK 40B and $N_2$. The thickness of the extruded foam sheet was 0.85 mm. This sheet was not stretched.

COMPARATIVE EXAMPLE 1

An extruded polyvinyl chloride (PVC) sheet was stretched with a stretch ratio 3×1 at 90° C. The shrinkage of PVC was measured as described in Example 1.

Table 1 shows that the extruded foamed film/sheets, as described in Examples 1–7, all are white opaque and lighter than water. The following Table 1 demonstrates that stretched foamed PETG film has good shrinkage at various temperatures compared to Comparative Example 1 which is a very popular commercial shrink film.

TABLE 1

| Color and Floatability of Extruded Foamed Film | | |
| --- | --- | --- |
| Example | Color | Floats in water |
| 1 | Opaque White | Yes |
| 2 | Opaque White | Yes |
| 3 | Opaque White | Yes |
| 4 | Opaque White | Yes |
| 5 | Opaque White | Yes |
| 6 | Opaque White | Yes |
| 7 | Opaque White | Yes |

TABLE 2

| Shrinkage of Examples 1–5 and Comparative Example 1 | | | | | | |
| --- | --- | --- | --- | --- | --- | --- |
| Temp. (°C.) | Ex. 1 (%) | Ex. 2 (%) | Ex. 3 (%) | Ex. 4 (%) | Ex. 5 (%) | Comp. Ex. 1 (%) |
| 65 | 4.0 | 4.5 | 10.0 | 1.0 | 3.5 | 9 |
| 70 | 25.5 | 42.0 | 31.5 | 2.0 | 28.0 | 31 |
| 75 | 50.5 | 50.5 | 57.0 | 31.5 | 52.0 | 46 |
| 80 | 60.5 | 62.5 | 67.5 | 53.0 | 66.0 | 51 |
| 85 | 71.0 | 71.5 | 74.0 | 62.5 | 72.0 | 54 |
| 90 | 73.0 | 73.0 | 74.5 | 69.0 | 74.5 | 57 |

This invention has been described in detail with particular reference to preferred embodiments and methods thereof, but it will be understood that variations and modifications can be effected within the spirit and scope of the invention.

What is claimed is:

1. A label for containers comprising a foamed polyester film having a density of less than 1 $g/cm^3$ wherein said foamed polyester film may be blown away in air and then floated away in water during a recycle process for containers.

2. The label as recited in claim 1 wherein after being floated away said foamed polyester film is reclaimed by a chemical process to recover raw materials for polyesters.

3. The label as recited in claim 1 wherein said foamed polyester film has a thickness of about 6 microns to about 5 millimeters.

4. The label as recited in claim 1 wherein said foamed polyester film is heat shrinkable.

5. The label as recited in claim 4 wherein said foamed polyester film is selected from the group comprising 1,4-cyclohexyldimethanol modified poly(ethylene terephthalate) and isophthalic acid modified poly(ethylene terephthalate).

6. The label as recited in claim 1 wherein said recyclable film is coated on at least one side with a clear polyester material containing additives selected from the group comprising slip agents, antiblocking agents, plasticizers, optical brightener, and ultra violet inhibitor.

7. The label as recited in claim 1 wherein said recyclable film contains additives selected from the group comprising slip agents, antiblocking agents, plasticizers, optical brightener, and ultra violet inhibitor.

\* \* \* \* \*

UNITED STATES PATENT AND TRADEMARK OFFICE
CERTIFICATE OF CORRECTION

PATENT NO. : 5,567,511
DATED : October 22, 1996
INVENTOR(S) : Wayne K. Shih, et al.

It is certified that error appears in the above-indentified patent and that said Letters Patent is hereby corrected as shown below:

Claim 5, line 2; Claim 6, lines 3 and 4; and Claim 7, line 2; each occurrence of "selected from the group comprising" should read --- selected from the group consisting of ---.

Signed and Sealed this

Eighteenth Day of March, 1997

Attest:

BRUCE LEHMAN

*Attesting Officer*     *Commissioner of Patents and Trademarks*